United States Patent [19]
Choi et al.

[11] Patent Number: 5,781,612
[45] Date of Patent: Jul. 14, 1998

[54] RADIO TERMINAL INTERFACES FOR VOICE AND DATA TELECOMMUNICATIONS, AND METHODS FOR THEIR OPERATION

[75] Inventors: David Choi, Kanata, Canada; Kishore John Raj, Plano, Tex.

[73] Assignee: Northern Telecom Limited, Montreal, Canada

[21] Appl. No.: 402,049

[22] Filed: Mar. 10, 1995

[51] Int. Cl.$^6$ .................................................. H04Q 7/20
[52] U.S. Cl. .......................... 379/58; 379/57; 455/54.1
[58] Field of Search ............................. 379/58, 59, 57; 455/33.1, 54.1; 370/95.3, 95.1

[56] References Cited

U.S. PATENT DOCUMENTS

| | | | |
|---|---|---|---|
| 4,890,315 | 12/1989 | Bendixen et al. | 379/59 |
| 4,953,197 | 8/1990 | Kaewell, Jr. et al. | 379/58 |
| 5,020,091 | 5/1991 | Krolopp et al. | 379/58 |
| 5,420,911 | 5/1995 | Dahlin et al. | 379/59 |
| 5,436,955 | 7/1995 | Kaewell, Jr. et al. | 379/59 |
| 5,437,053 | 7/1995 | Sawa et al. | 455/33.1 |
| 5,515,397 | 5/1996 | Wiorek | 379/58 X |

OTHER PUBLICATIONS

Barber et al., "Dual-Mode System Provides Smooth Evolution Path". Telesis, 1992, 94:35–51.
"Dual-Mode Mobile Station—Base Station Compatibility Standard", Electronic Industries Association, 1989, pp. 2-79-2-106.

*Primary Examiner*—Curtis Kuntz
*Assistant Examiner*—William G. Trost
*Attorney, Agent, or Firm*—Foley & Lardner

[57] ABSTRACT

A radio terminal interface includes a signal processor and a controller. The signal processor has a TDMA mode of operation and an AMPS mode of operation. The controller composes signals for registering first and second Mobile Identification Numbers (MINs) assigned to the radio terminal interface in a cellular radio system. The controller also identifies page requests received while the radio terminal interface is in an idle state, and responds to received page requests specifying the first MIN by composing page responses specifying the first MIN. The controller responds to received page requests specifying the second MIN by composing page responses specifying the second MIN. The controller responds to initial traffic channel designation messages received by the radio terminal interface by configuring the signal processor in its TDMA mode, and responds to initial voice channel designation messages by configuring the signal processor in its AMPS mode. The controller responds to a dialling sequence by composing service requests, the service requests specifying the first MIN when the dialling sequence does not contain a predetermined dialling sequence, and specifying the second MIN when the dialling sequence does contain the predetermined dialling sequence. The radio terminal interface can be used to ensure that voice-band data calls (e.g. facsimile transmissions) are assigned AMPS channels by dual-mode cellular radio systems.

21 Claims, 9 Drawing Sheets

RADIO TERMINAL INTERFACES FOR VOICE AND DATA TELECOMMUNICATIONS, AND METHODS FOR THEIR OPERATION

FIELD OF INVENTION

This invention relates to radio terminals for voice and data telecommunications and to methods for their operation.

BACKGROUND OF INVENTION

Cellular radio telecommunications was introduced in North America in the 1980s in the form of the Advanced Mobile Phone Service (AMPS). AMPS uses frequency division multiplexed analog radio channels for communication between terminals and base stations. Regulatory authorities have limited the radio frequency spectrum allocated to cellular radio telecommunications, and this limits the number of channels available in each cell of an AMPS system.

By the late 1980s it became clear that the growing demand for cellular telecommunications service would soon exceed the capacity of AMPS systems. Consequently, digital Time Division Multiple Access (TDMA) cellular radio telecommunications systems were introduced in the 1990s. TDMA systems use VSELP coding techniques to compress 64 kbps PCM voice signals and time division multiplex the compressed digital signals for communication between terminals and base stations. Three or more time division multiplexed channels can be carried on each frequency division multiplexed radio channel of a TDMA system to increase capacity by a factor of three or more relative to AMPS systems operating in the same allocated radio frequency spectrum.

Recognizing the need to support both users having older AMPS terminals and users having newer TDMA terminals, in 1992 Northern Telecom introduced DMS-MTX cellular radio systems capable of operating in both AMPS and TDMA modes (See "Dual-mode Cellular System Provides Smooth Evolution Path", Telesis, Issue 94, Jul. 1992). Each time a call attempt is made to or from a cellular terminal, the DMS-MTX system determines whether that terminal operates in AMPS or TDMA mode, and allocates an AMPS or TDMA channel to that terminal accordingly.

Terminal vendors have also introduced cellular terminals capable of operating in both AMPS and TDMA modes. Generally such terminals preferentially operate in TDMA mode in regions where TDMA service is available, and dual-mode systems such as the DMS-MTX will preferentially allocate TDMA channels to such dual-mode terminals when such channels are available.

Terminal vendors have also introduced interface units which enable standard landline telephones to be connected to cellular radio systems for operation as cellular radio telephones. Such interface units comprise a radio transceiver for radio communication with base stations of cellular radio systems, and an RJ-11 interface for connection of the standard telephone to the radio transceiver. The transceiver may be a dual-mode transceiver capable of operation in both AMPS mode and TDMA mode according to the type of cellular service available where the interface is located. If dual-mode cellular radio service is available where the interface is located, both the interface and the cellular radio system will normally operate in TDMA mode.

Landline terminals other than telephones may also be connected to the RJ-11 interface. For example, facsimile machines or data modems may be connected to the RJ-11 interface for the transmission or reception of voice-band data via the cellular radio system. If dual-mode cellular radio service is available where the interface is located and the interface is capable of dual-mode operation, the TDMA mode of operation will be preferentially selected. However, the VSELP coding techniques which are used to compress digital signals in TDMA systems are optimized for voice signals. While TDMA channels provide good transmission performance for voice signals, they may not be adequate for voice-band data transmission as required by facsimile machines and data modems. Consequently, the error rate for voice-band data transmission over TDMA channels may be unacceptably high.

SUMMARY OF INVENTION

An object of one aspect of this invention is to provide radio terminal interfaces for voice and data telecommunications which reduce or avoid some or all of the problems outlined above.

An object of another aspect of this invention is to provide methods of operating radio terminal interfaces which reduce or avoid some or all of the problems outlined above.

One aspect of this invention provides a radio terminal interface comprising a signal processor and a controller. The signal processor has a first mode of operation for converting Time Division Multiple Access (TDMA) signals to voice-band signals and for converting voice-band signals to TDMA signals, and a second mode of operation for converting Advanced Mobile Phone Service (AMPS) signals to voice-band signals and for converting voice-band signals to AMPS signals. The controller monitors signals received by the radio terminal interface, composes signals for transmission from the radio terminal interface and selects between the first and second modes of operation of the signal processor. The controller composes signals for registering first and second Mobile Identification Numbers (MINs) assigned to the radio terminal interface in a cellular radio system. The controller also identifies page requests received while the radio terminal interface is in an idle state and responds to received page requests specifying the first MIN by composing page responses specifying the first MIN. The controller responds to received page requests specifying the second MIN by composing page responses specifying the second MIN.

The radio terminal interface as defined above has two distinct MINs both of which it registers in a cellular radio network. One of the MINs may be designated in the cellular radio network as requiring an AMPS channel. Consequently, the cellular radio network will automatically allocate an AMPS channel to incoming calls specifying that MIN. Callers wishing to place voice-band data calls (e.g. for facsimile transmission) to terminals connected to the radio terminal interface may be instructed to dial the MIN which will be automatically allocated an AMPS channel to ensure adequate voice-band data transmission performance.

The controller may respond to initial traffic channel designation messages received by the radio terminal interface by configuring the signal processor for its first mode of operation, and may respond to initial voice channel designation messages received by the radio terminal interface by configuring the signal processor for its second mode of operation.

Consequently, the radio terminal interface may automatically configure itself for the type of channel allocated by the cellular radio network.

The controller may respond to a dialling sequence received by the radio terminal interface by composing a service request, the service request specifying the first MIN when the dialling sequence does not contain a predetermined dialling sequence, and the service request specifying the second MIN when the dialling sequence does contain the predetermined dialling sequence.

Consequently, users placing outgoing voice-band data calls from the radio terminal interface may dial a special dialling sequence to cause the interface to specify a MIN to which the cellular radio system will allocate an AMPS channel, thereby ensuring adequate voice-band data transmission performance for the outgoing call.

The radio terminal interface may further comprise a Radio Frequency (RF) interface for coupling to an antenna system to receive radio signals from a base station of the cellular radio system and to transmit radio signals from the radio terminal interface to the base station, and an audio interface for coupling to telecommunications terminals to receive voice-band signals from the telecommunications terminals and to transmit voice-band signals from the radio terminal interface to the telecommunications terminals. The signal processor may be coupled between the RF interface and the audio interface.

The radio terminal interface may also comprise an RJ-11 interface connected to the audio interface for coupling the audio interface to telecommunications terminals.

Another aspect of the invention provides a method for operating a radio terminal interface. The method comprises registering first and second Mobile Identification Numbers (MINs) assigned to the radio terminal interface in a cellular radio system, receiving page requests at the radio terminal interface while the radio terminal interface is in an idle state and responding to received page requests. Received page request specifying the first MIN are responded to by transmitting from the interface a page response specifying the first MIN. Received page requests specifying the second MIN are responded to by transmitting from the interface a page response specifying the second MIN.

The method for operating the radio terminal interface may further comprise receiving initial traffic channel designation messages at the radio terminal interface, and responding to received initial traffic channel designation messages by configuring a signal processor of the radio terminal interface in a first mode for conversion of Time Division Multiple Access (TDMA) signals to voice-band signals and for conversion of voice-band signals to TDMA signals.

The method for operating the radio terminal interface may also comprise receiving initial voice channel designation messages at the radio terminal interface, and responding to received initial voice channel designation messages by configuring a signal processor of the radio terminal interface in a second mode for conversion of Advanced Mobile Phone Service (AMPS) signals to voice-band signals and for conversion of voice-band signals to AMPS signals.

In addition, the method for operating the radio terminal interface may comprise responding to a dialling sequence received at the radio terminal interface by composing and transmitting from the radio terminal interface a service request, the service request specifying the first MIN when the dialling sequence does not contain a predetermined dialling sequence, and the service request specifying the second MIN when the dialling sequence does contain the predetermined dialling sequence.

BRIEF DESCRIPTION OF DRAWINGS

Embodiments of the invention are described below by way of example only. Reference is made to accompanying drawings in which.

DETAILED DESCRIPTION

Figure 1:
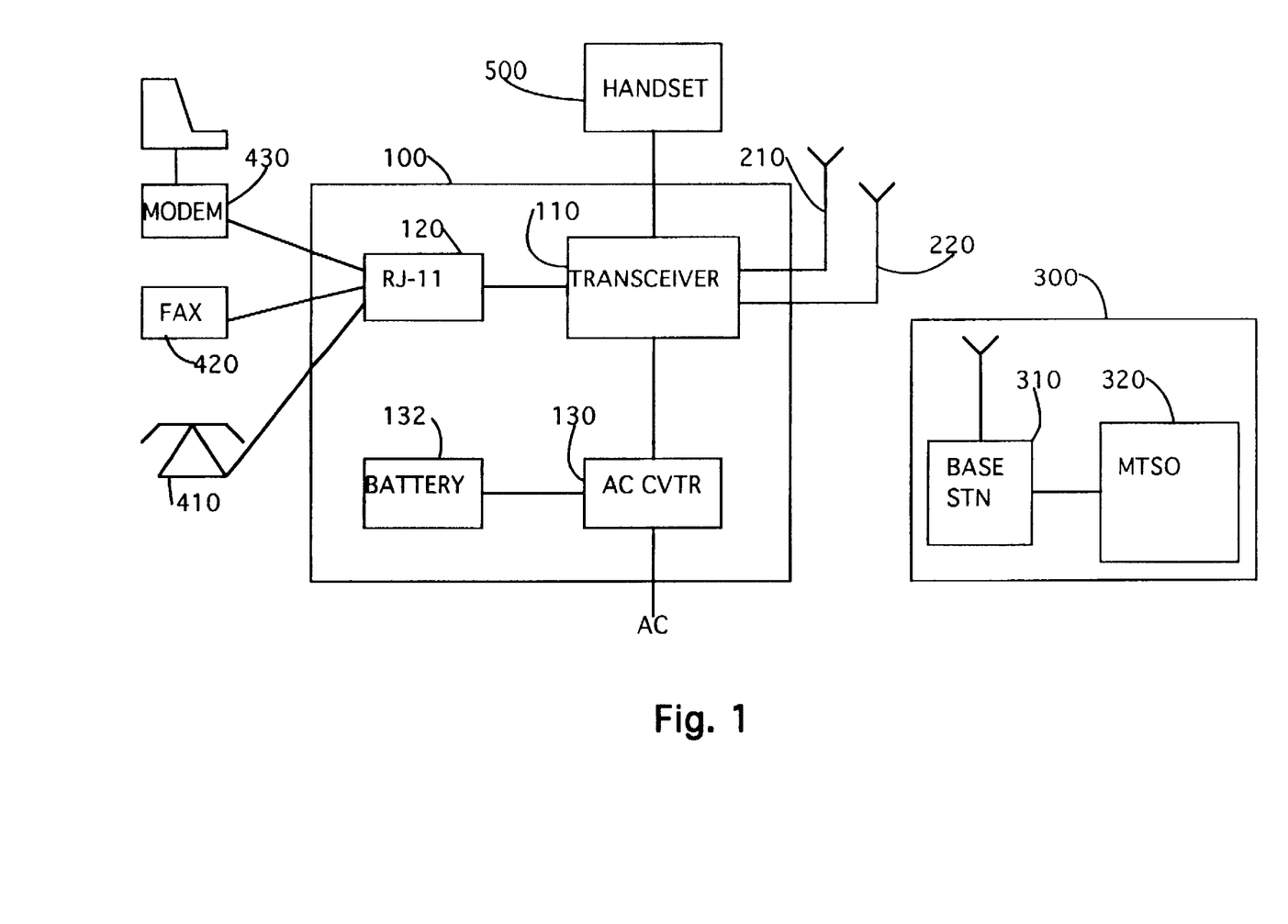
FIG. 1 is a block schematic view of a dual mode radio terminal interface according to an embodiment of the invention.

FIG. 1 is a block schematic view of a dual-mode radio terminal interface 100 according to an embodiment of the invention. The radio terminal interface 100 comprises a dual-mode radio transceiver 110 and an RJ-11 interface 120 coupled to the radio transceiver 110. One or more antennas 210, 220 are coupled to the radio transceiver 110 to enable radio transmission between the radio transceiver 110 and at least one base station 310 of a cellular radio system 300. Standard landline telephones 410, facsimile machines 420 and voice-band data modems 430 may be connected to the RJ-11 interface 120 to make and receive calls over the cellular radio system via the radio terminal interface 100. A cellular radio terminal handset 500 may also be directly coupled to the radio transceiver 210 to make and receive calls over the cellular radio system.

An AC adaptor 130 fed in parallel by a battery 132 and an AC power source (not shown) powers the radio transceiver 110. The battery 132 provides power in the event of an AC power failure, and when the interface 100 is not connected to an AC power source (e.g. if the interface 100 is used in a mobile application).

Figure 2:
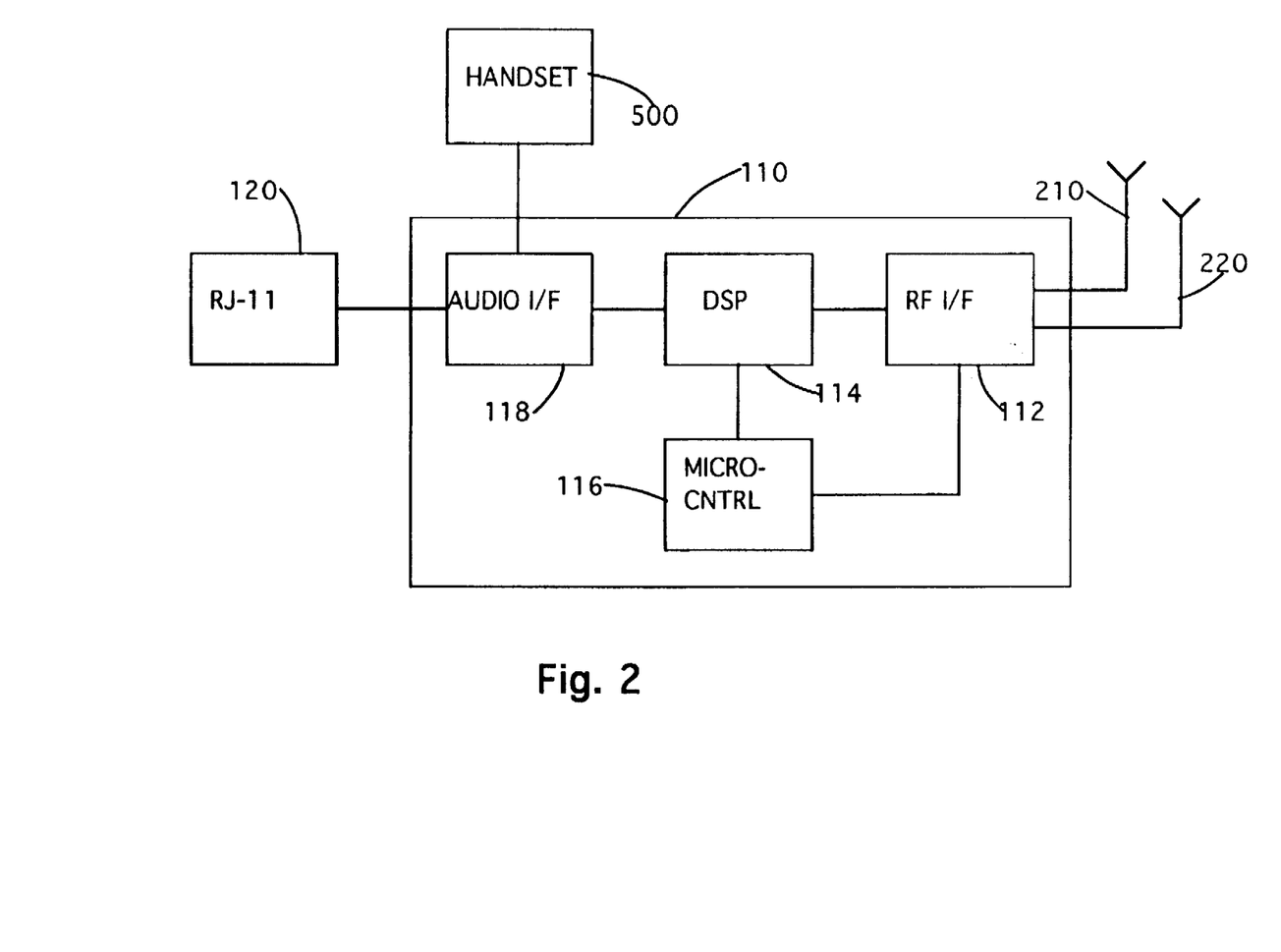
FIG. 2 is a block schematic diagram showing a transceiver of the radio terminal interface of FIG. 1 in greater detail.

FIG. 2 is a block schematic diagram showing the radio transceiver 110 in greater detail. The radio transceiver 110 comprises a RF interface 112 coupled to the antennas 210, 220, a digital signal processor (DSP) 114, a microcontroller 116 and an audio interface 118 coupled to the RJ-11 interface 120 and the optional cellular radio terminal handset 500. antennas 210 and 220 may be arranged to provide spatial diversity. The DSP 114 formats signals received from the audio interlace 118 for transmission by the RF interface 112 to base stations 310 of the cellular radio system (300), and formats signals received from the RF interface 112 for transmission by the audio interface 118 to the RJ-11 interface 120 and the optional handset 500.

The DSP 114 has a first mode of operation for converting digital TDMA format signals received by the RF interface 112 to analog voice band signals for transmission to the audio interface 118 and vice versa, and a second mode of operation for converting analog AMPS format signals received by the RF interface 112 to analog voice-band signals for transmission to the audio interface 118 and vice versa. The microcontroller 116 selects the appropriate mode of operation for the DSP 114, provides control signals for transmission to base stations of the cellular radio system via the DSP 114 and the RF interface 112, and interprets and responds to control signals received from the base stations 310 via the RF interface 112 and the DSP 114 as described in detail below.

The interface 100 complies generally with mobile station requirements as specified in EIA/TIA Standard IS-54 entitled "Dual-mode Mobile Station—Base Station Compatibility Standard". This standard was published by the Electronic Industries Association in December 1989, and is hereby incorporated in its entirety by reference. Relevant sections of the standard are referenced in parentheses in the description which follows.

Figure 3A:
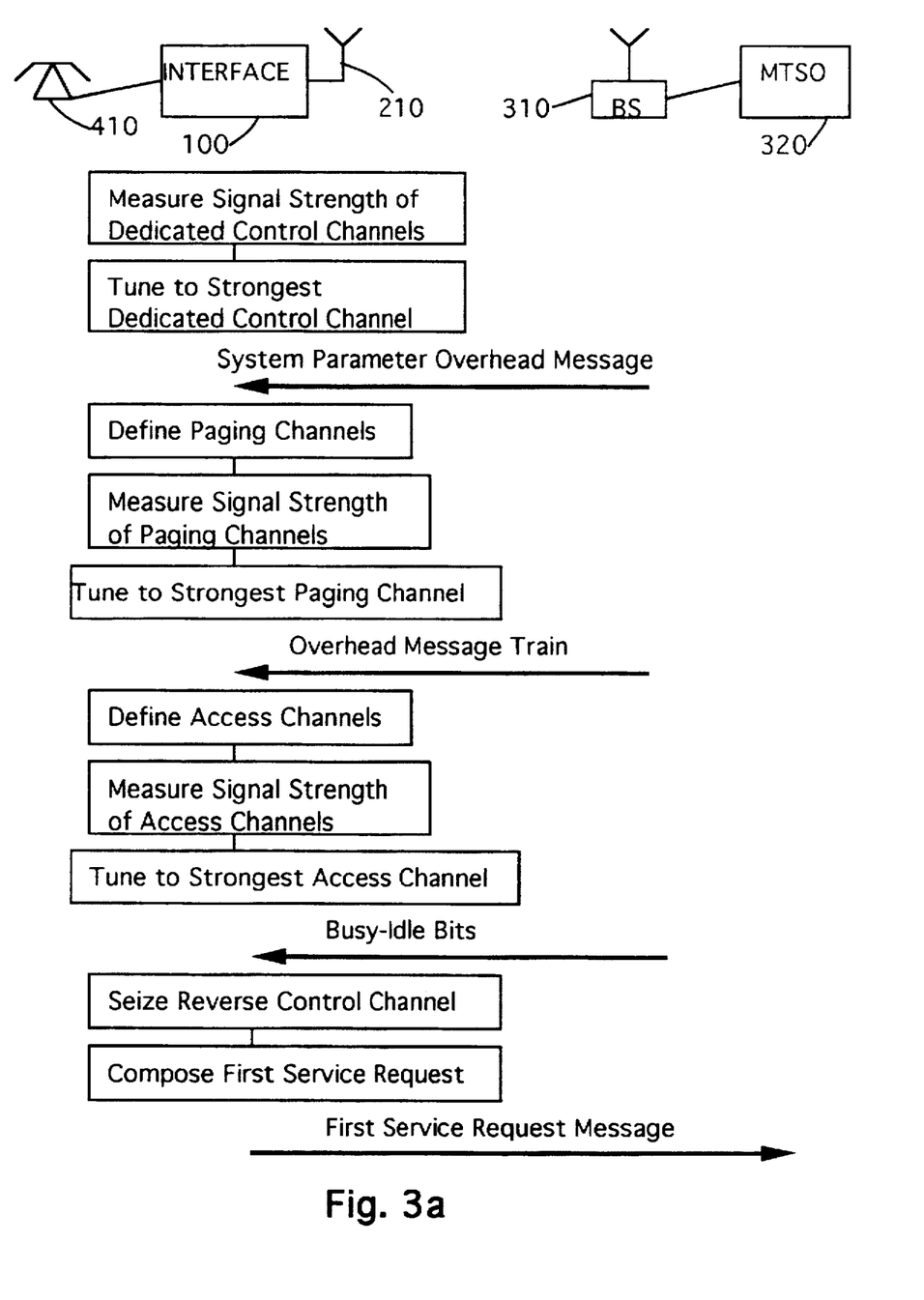
FIGS. 3a and 3b are message flow diagrams showing process steps for the registration of radio terminal interface of FIG. 1.
Figure 3B:
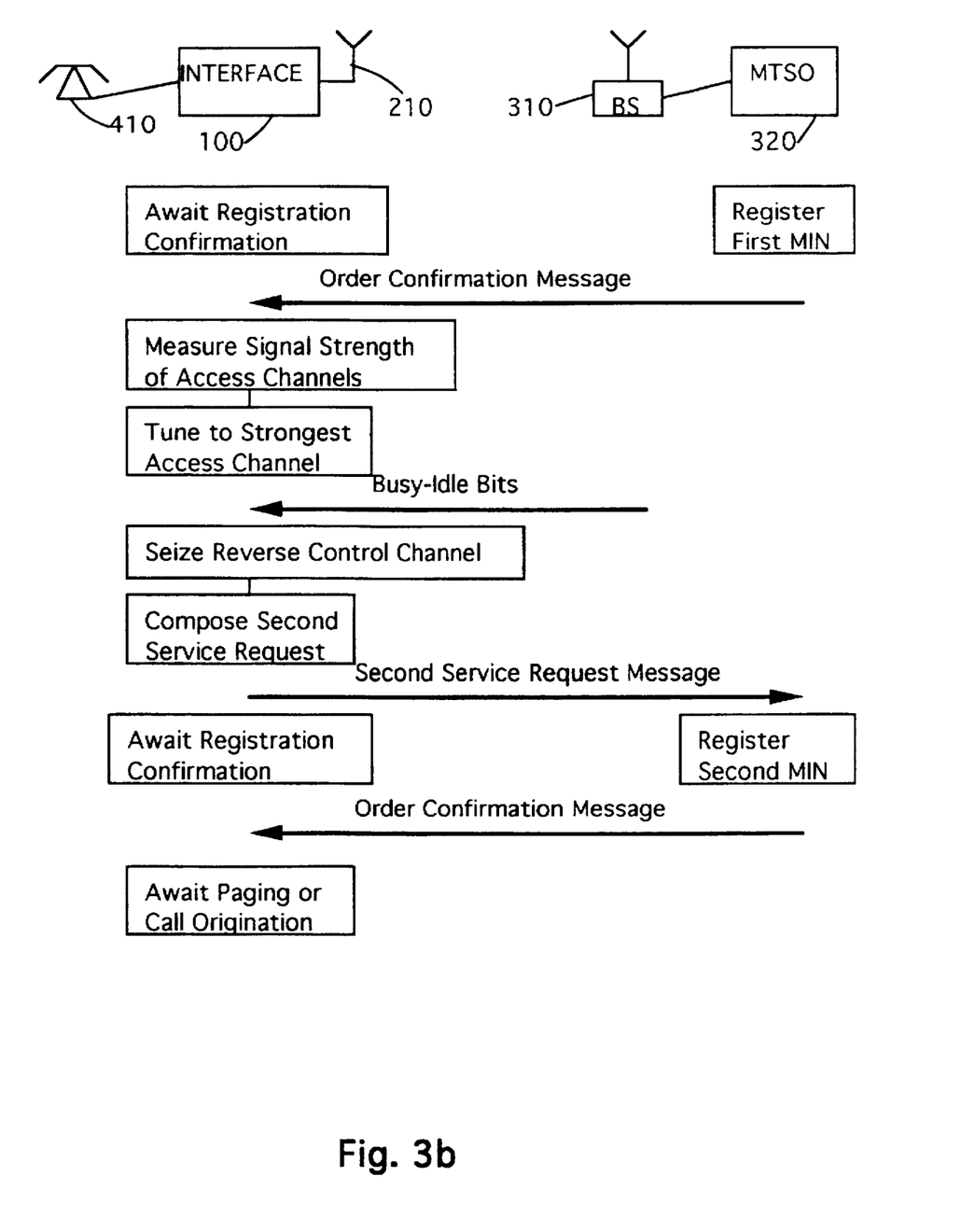

When the interface is turned on, the microcontroller 116 cooperates with the DSP 114 and the RF interface 112 to perform Initialization (2.6.1) and System Access (2.6.3) tasks required by the IS-54 standard. The Initialization task (2.6.1) is performed once, and the System Access task (2.6.3) is performed twice, once for each of two Mobile Identification Numbers (MINs) assigned to the interface. This process is illustrated in FIG. 3 and described in more detail below.

To complete the Initialization task (2.6.1), the microcontroller 116 measures the signal strength of each of several dedicated control channels used by the cellular radio system 300 (2.6.1.1.1), tunes the RF interface 112 to the strongest dedicated control channel and receives a system parameter overhead message identifying the cellular radio system and its configuration and capabilities. The microcontroller 116 then defines a group of paging channels based on data in the system parameter overhead message (2.6.1.1.2), measures the signal strength of each paging channel (2.6.1.2.1), and tunes to the strongest paging channel (2.6.1.5). The microcontroller 116 then puts the interface 100 in an Idle state (2.6.2) in which it receives and responds to an overhead message train by defining a group of access channels (2.6.2.1).

The microcontroller 116 then proceeds to the System Access task (2.6.3), measuring the signal strength of each access channel (2.6.3.2), tuning to the strongest access channel (2.6.3.2), reading busy-idle bits of the access channel and seizing a reverse control channel when the busy-idle bits of the access channel indicate that the reverse control channel is Idle (2.6.3.5). The microcontroller 116 composes a first Service Request message which includes a first Mobile Identification Number (MIN) and causes the RF interface 112 to transmit the first Service Request message to the base station 310 (2.6.3.7). The microcontroller 116 then puts the interface 100 in an Await Registration Confirmation state (2.6.3.9).

The base station 310 forwards the first Service Request message to a Mobile Telephone Switching Office (MTSO) 320 which registers the first MIN so that calls directed to the first MIN can be routed to the interface 100. The MTSO 320 sends a message to the base station 310 confirming registration of the first MIN, and the base station 310 sends an Order Confirmation message to the interface 100.

The microcontroller 116 then returns the interface 100 to the System Access task (2.6.3) for registration of a second MIN. In particular, the microcontroller 116 again measures the signal strength of the access channels (2.6.3.2), tunes the RF interface 112 to the strongest access channel (2.6.3.2), reads busy-idle bits of the access channel and seizes a reverse control channel when the busy-idle bits of the access channel indicate that the reverse control channel is idle (2.6.3.5). The microcontroller 116 composes a second Service Request message which includes a second Mobile Identification Number (MIN) and causes the RF interface 112 to transmit the second service request message to the base station 310 (2.6.3.7). The microcontroller 116 then puts the interface 100 in an Await Registration Confirmation state (2.6.3.9).

The base station 310 forwards the second Service Request message to the MTSO 320 which registers the second MIN so that calls directed to the second MIN can be routed to the interface 100. The MTSO 320 sends a message to the base station 310 confirming registration of the second MIN, and the base station 310 sends an Order Confirmation message to the interface 100.

The microcontroller 116 then returns the interface 100 to its Idle state (2.6.2) to await paging or call origination.

Callers request connections to the terminals 410, 420, 430, 500 connected to the interface 100 by dialling either the first or second MIN associated with the interface 100. Subscriber databases of the cellular radio network 300 are datafilled such that calls directed to the first MIN are preferentially routed by way of a digital TDMA channel between the base station 310 and the interface 100, and calls directed to the second MIN are routed by way of an analog voice channel.

Figure 4A:
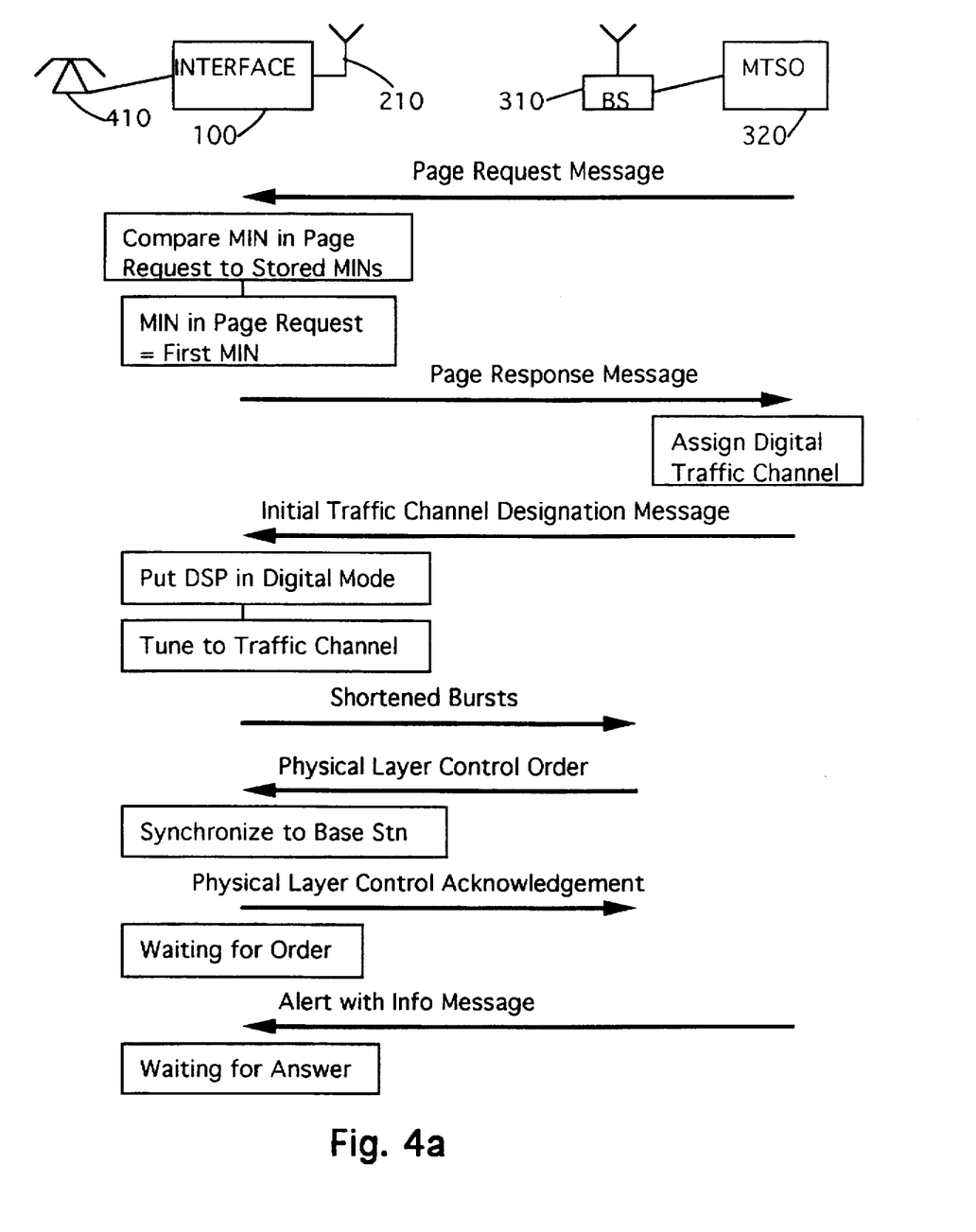
FIGS. 4a and 4b are message flow diagrams showing process steps for handling incoming calls to a first Mobile Identification Number (MIN) of the radio terminal interface of FIG. 1.
Figure 4B:
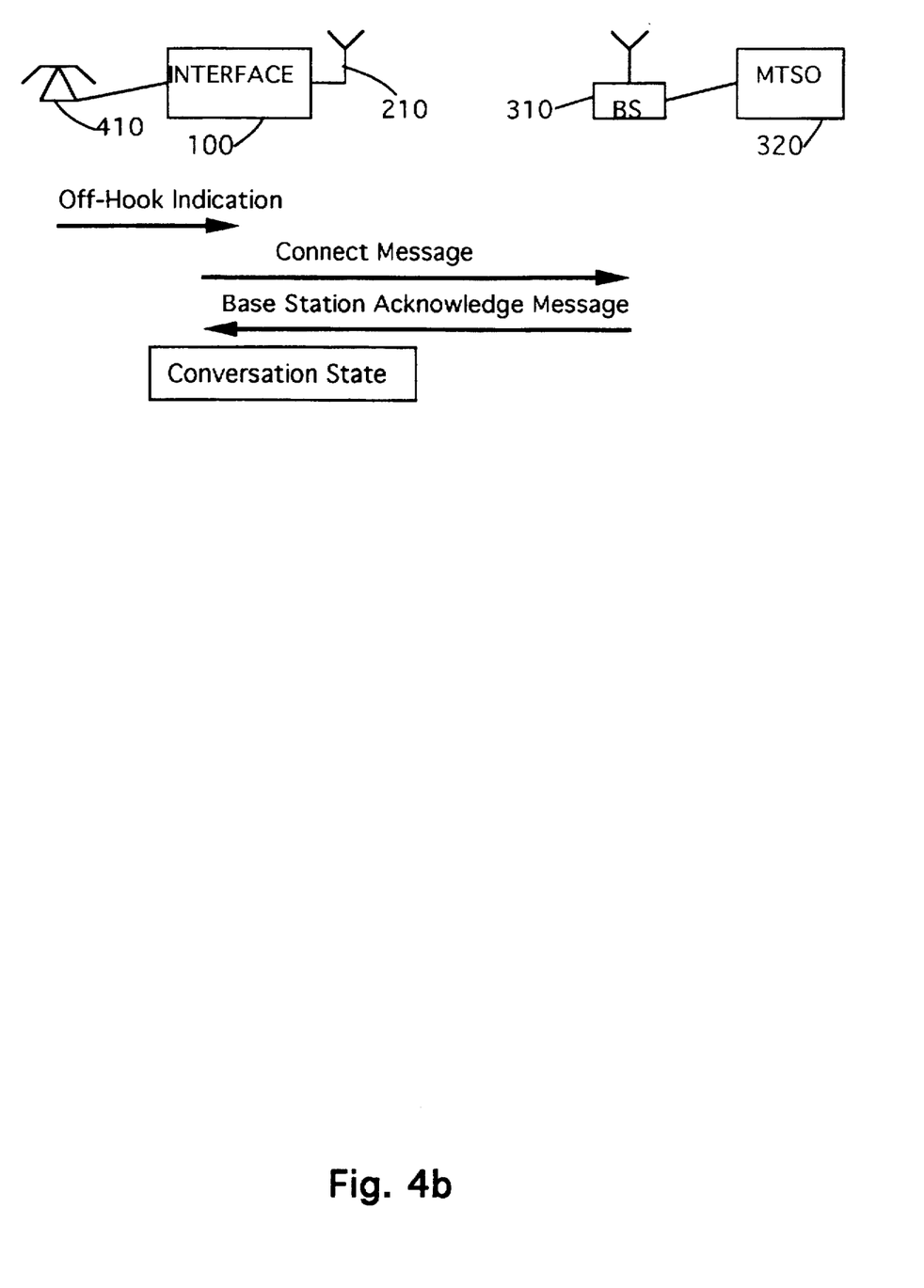

Process steps used to complete connections for incoming calls requesting the first MIN are illustrated in FIG. 4. When the MTSO 320 receives a connection request specifying the first MIN, it causes the base station 310 to transmit a Page Request message including the first MIN to the interface 100. The interface 100, which is in its Idle state (2.6.2) monitoring the overhead message train, receives the Page Request message. The microcontroller 116 recognizes the Page Request message and compares the MIN it contains to the first and second MINs associated with the interface (2.6.2.2). Because the MIN in the Page Request message matches the first MIN of the interface 100, the microcontroller 116 proceeds to the System Access task (2.6.3) and sends a Page Response message back to the base station 310 via the RF interface 112.

The base station 310 forwards the Page Response message to the MTSO 320 which preferentially assigns a digital traffic channel to the call. The MTSO 320 then sends via the base station 310 an Initial Traffic Channel Designation message to the interface 100 specifying the digital TDMA channel to be used by the interface 100 for the call. The microcontroller 116 configures the DSP in its first mode of operation for converting digital TDMA format signals received by the RF interface 112 to analog voice band signals for transmission to the audio interface 118 and vice versa, and proceeds to a Confirm Initial Traffic Channel task (2.6.5.2), tuning the RF interface to the assigned traffic channel and transmitting shortened bursts via the RF interface 112 to the base station 310. On receipt of the shortened bursts on the assigned traffic channel, the base station 310 transmits a Physical Layer Control Order containing timing information. The microcontroller 116 uses the received timing information to synchronize the operation of the interface 100 with the base station 310, sends a Physical Layer Control Acknowledgement message to the base station 310, and proceeds to a Waiting For Order task (2.6.5.3.1).

The MTSO 320 then sends an Alert With Info message to the interface 100 via the base station 310, and the microcontroller 116 proceeds to a Waiting For Answer task (2.6.5.3.2). If one of the terminals 410, 420, 430, 500 goes off-hook, the microcontroller 116 sends a Connect message to the base station 310. The base station 310 responds with a Base Station Acknowledgement message. On receipt of the Base Station Acknowledgement message the microcontroller 116 proceeds to a Conversation task (2.6.5.4), and the communication link over the TDMA channel is established to connect the caller to the off-hook terminal.

If none of the terminals 410, 420, 430 goes off-hook within a timed interval while the interface 100 is performing the Waiting For Answer task, the microcontroller proceeds to a Release task (2.6.5.5) to release the resources allocated to the attempted connection.

Figure 5:
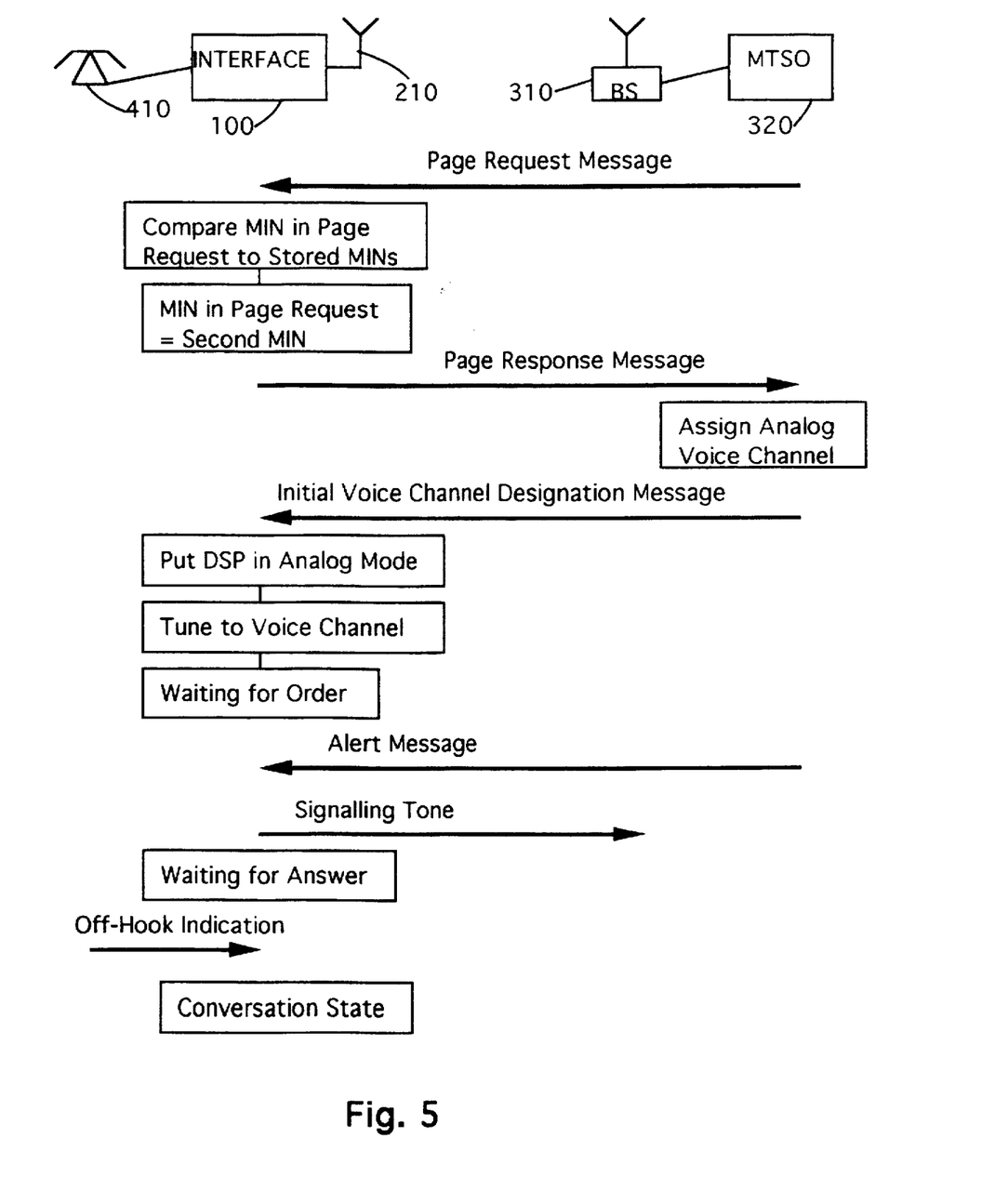
FIG. 5 is a message flow diagram showing process steps for handling incoming calls to a second MIN of the radio terminal interface of FIG. 1.

Process steps used to complete connections for incoming calls requesting the second MIN are illustrated in FIG. 5. When the MTSO 320 receives a Connection Request specifying the second MIN, it causes the base station 310 to transmit a Page Request message including the second MIN to the interface 100. The interface 100, which is in its Idle state (2.6.2) monitoring the overhead message train, receives the Page Request message. The microcontroller 116 recognizes the Page Request message and compares the MIN it contains to the first and second MINS associated with the interface (2.6.2.2). Because the MIN in the Page Request message matches the second MIN of the interface 100, the microcontroller 116 proceeds to the System Access task (2.6.3) and sends a Page Response message back to the base station 310 via the RF interface 112.

The base station 310 forwards the Page Response message to the MTSO 320 which assigns an analog voice channel to the call. The MTSO 320 then sends via the base station 310 an Initial Voice Channel Designation message to the interface 100 specifying the analog voice channel to be used by the interface 100 for the call. The microcontroller 116 configures the DSP in its second mode of operation for converting analog AMPS format signals received by the RF interface 112 to analog voice band signals for transmission to the audio interface 118 and vice versa, and proceeds to a Confirm Initial Voice Channel task (2.6.4.2), tuning the RF interface to the assigned voice channel. The microcontroller 116 then proceeds to a waiting For Order task (2.6.4.3.1).

The MTSO 320 then sends an Alert message to the interface 100 via the base station 310. On receipt of the Alert message, the microcontroller 116 causes the RF interface 112 to transmit a signalling tone and proceeds to a waiting for answer task (2.6.4.3.2). If one of the terminals 410, 420, 430, 500 goes off-hook, the microcontroller 116 turns off the signalling tone and proceeds to a Conversation task (2.6.4.4), and the communication link over the analog voice channel is established to connect the caller to the off-hook terminal.

If none of the terminals 410, 420, 430 goes off-hook within a timed interval while the interface 100 is performing the waiting for answer task, the microcontroller proceeds to a Release task (2.6.4.5) to release the resources allocated to the attempted connection.

Because the interface 100 is able to respond to two different dialled MINs, one of which is recognized by the cellular radio system as requiring an analog voice channel, callers can ensure that they are connected to the terminals 410, 420, 430, 500 connected via an analog voice channel when that is necessary to ensure adequate transmission performance. In particular, callers sending voice-band data to the facsimile terminal 420 or voice-band data modem 330 connected to the interface 100 may ensure that an analog voice channel is allocated by dialling the second MIN, whereas callers requiring a voice connection to the telephone 410 or handset 500 connected to the interface may dial the first MIN to be preferentially allocated a digital TDMA channel.

If the interface 100 is not in its Idle state (2.6.2) when the base station 310 transmits a Page Request specifying one of its two MINs, it is not monitoring the overhead message train and consequently does not recognize the Page Request. Consequently, the interface 100 does not send a Page Response, and the MTSO 320 determines from the lack of a Page Response that the interface 100 is not available to receive the call. No special features are needed in the interface 100 to cope with attempted calls to the second MIN when a connection to the first MIN is already in place and vice versa.

Figure 6:
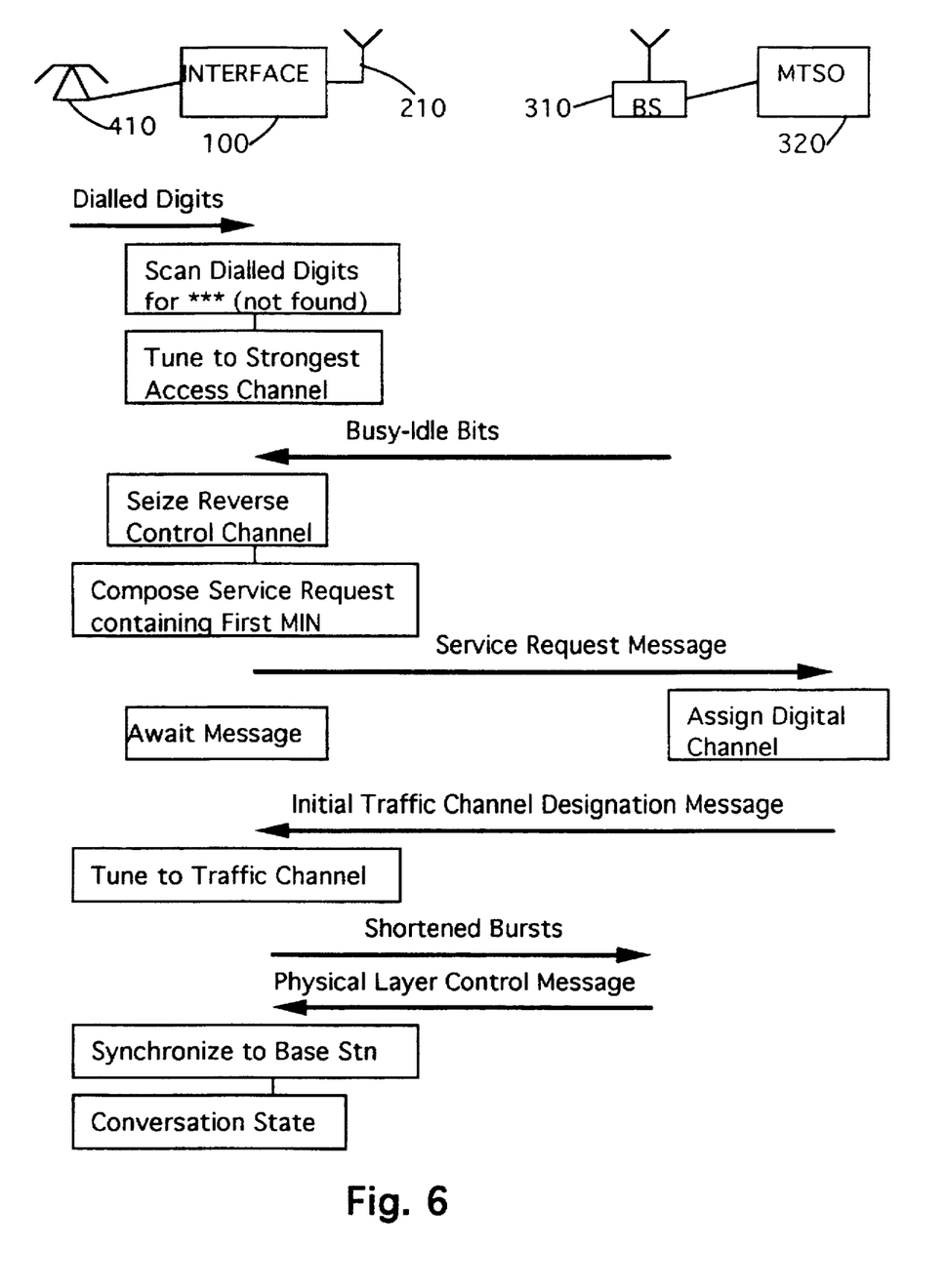
FIG. 6 is a message flow diagram showing a first set of process steps for handling outgoing calls from the radio terminal interface of FIG. 1.

A first set of process steps for completing an outgoing call is illustrated in FIG. 6. With the interface 100 in its Idle state (2.6.2) the user dials an outgoing call on one of the terminals 410, 420, 430, 500 connected to the interface 100. The microcontroller 116 scans the dialled digits and determines whether the dialled digits include a special dialling sequence (e.g. ***) in addition to a normal dialling sequence.

The microcontroller 116 then proceeds to the System Access task (2.6.3), scanning the access channels and tuning to the strongest one (2.6.3.2). The microcontroller 116 monitors busy-idle bits of the access channel, and seizes a reverse analog control channel when the busy-idle bits indicate that it is idle (2.6.3.5). The microcontroller 116 composes a Service Request message for transmission to the MTSO 320 via the RF interface 112 and the base station 310. In the illustrated instance, the microcontroller 116 specifies the first MIN of the interface 100 in the Service Request message because the dialled digits do not include the special dialling sequence. The microcontroller 116 then proceeds to an Await Message task (2.6.3.8).

On receipt of the Service Request message, the MTSO 320 consults a database to determine that the first MIN specified in the service request can be assigned a digital TDMA channel. The MTSO preferentially assigns a digital TDMA channel to the interface 100 and causes the base station 310 to send an Initial Traffic Channel Designation message to the interface 100.

On receipt of the Initial Traffic Channel Designation message, the microcontroller 116 configures the DSP 114 its first mode for handling digital TDMA signals, tunes the RF interface 112 to the designated traffic channel and transmits shortened bursts on that channel (2.6.5.2). The base station 310 responds to the shortened bursts by sending a Physical Layer Control message containing timing information. The microcontroller 116 uses the timing information to synchronize operation of the interface 100 with the base station 310 and proceeds to the Conversation task (2.6.5.4).

Figure 7:
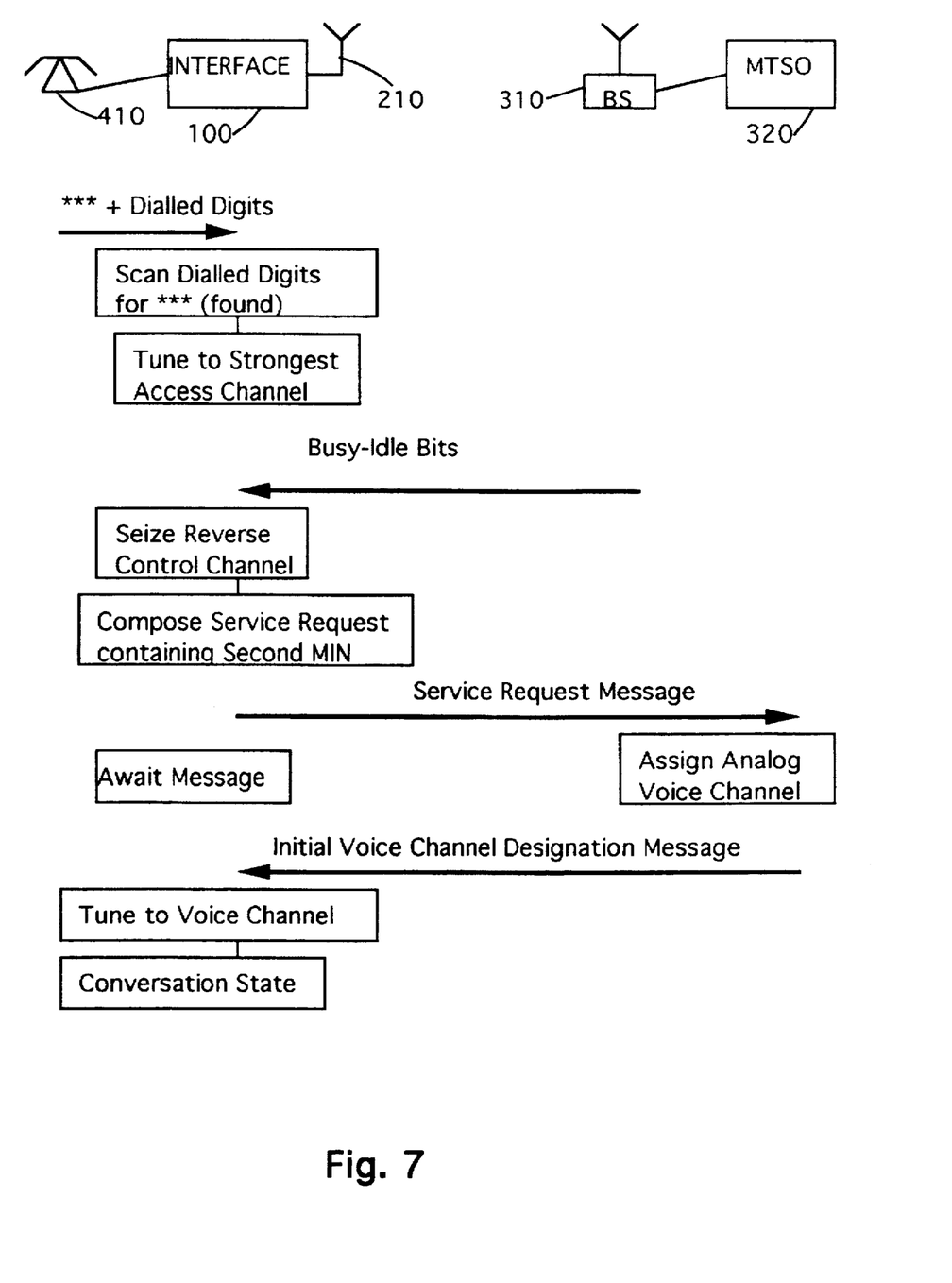
FIG. 7 is a message flow diagram showing a second set of process steps for handling outgoing calls from the radio terminal interface of FIG. 1.

The digital TDMA channel assigned to the outgoing call according to the above procedure may not be adequate for transmission of voice-band data calls placed by the facsimile terminal 420 or the voice-band data modem 430. FIG. 7 illustrates a second set of process steps for completing an outgoing call which ensures that an analog AMPS channel is assigned to the outgoing call. With the interface 100 in its Idle state (2.6.2) the user dials an outgoing call on one of the terminals 410, 420, 430, 500 connected to the interface 100, the dialled digits including a special dialling sequence (e.g. ***). The microcontroller 116 scans the dialled digits and determines that the dialled digits include the special dialling sequence in addition to a normal dialling sequence.

The microcontroller 116 then proceeds to the System Access task (2.6.3), scanning the access channels and tuning to the strongest one (2.6.3.2). The microcontroller 116 monitors busy-idle bits of the access channel, and seizes a reverse analog control channel when the busy-idle bits indicate that it is idle (2.6.3.5). The microcontroller 116 composes a Service Request message for transmission to the MTSO 320 via the RF interface 112 and the base station 310. The microcontroller 116 specifies the second MIN of the interface 100 in the Service Request message because the dialled digits include the special dialling sequence. The microcontroller 116 then proceeds to an Await Message task (2.6.3.8).

On receipt of the Service Request message, the MTSO 320 consults a database to determine that the second MIN specified in the service request must be assigned an analog AMPS channel. The MTSO assigns an analog voice channel to the interface 100 and causes the base station 310 to send an Initial Voice Channel Designation message to the interface 100.

On receipt of the Initial Voice Channel Designation message, the microcontroller 116 configures the DSP 114 in its second mode for handling analog AMPS signals, tunes the RF interface to the designated voice channel and proceeds to the Conversation task (2.6.4.4).

The embodiments described above may be modified without departing from the principles of the invention, the scope of which is defined by the claims below. For example, the RJ-11 interface could be eliminated and the radio terminal interface could be incorporated as an integral part of a cellular radio terminal having both voice and voiceband data capabilities.

We claim:

1. A radio terminal transceiver, comprising:

a signal processor having a first mode of operation for converting Time Division Multiple Access (TDMA) signals to voice-band signals and for converting voice-band signals to TDMA signals, and a second mode of operation for converting Advanced Mobile Phone Service (AMPS) signals to voice-band signals and for converting voice-band signals to AMPS signals; and a terminal transceiver controller for monitoring signals received by the radio terminal transceiver, for composing signals for transmission from the radio terminal transceiver, and for selecting between the first and second modes of operation of the signal processor, the terminal transceiver controller being operable to compose signals for registering first and second Mobile Identification Numbers (MINs) assigned to the radio terminal transceiver in a cellular radio system, to identify page requests received while the radio terminal transceiver is in an idle state, to respond to received page requests specifying the first MIN by composing page responses specifying the first MIN, wherein a digital channel is preferentially allocated and to respond to received page requests specifying the second MIN by composing page responses specifying the second MIN where the second MIN instructs the cellular radio system to always allocate an available analog channel for data transmissions between the cellular radio system and the radio terminal transceiver.

2. A radio terminal transceiver as defined in claim 1, wherein:

the terminal transceiver controller is operable to respond to initial traffic channel designation messages received by the radio terminal transceiver to configure the signal processor for its first mode of operation; and the terminal transceiver controller is operable to respond to initial voice channel designation messages received by the radio terminal transceiver to configure the signal processor for its second mode of operation.

3. A radio terminal interface, comprising:

a signal processor having a first mode of operation for converting Time Division Multiple Access (TDMA) signals to voice-band signals and for converting voice-band signals to TDMA signals, and a second mode of operation for converting Advanced Mobile Phone Service (AMPS) signals to voice-band signals and for converting voice-band signals to AMPS signals; and a controller for monitoring signals received by the radio terminal interface, for composing signals for transmission from the radio terminal interface and for selecting between the first and second modes of operation of the signal processor, the controller being operable to compose signals for registering first and second Mobile Identification Numbers (MINs) assigned to the radio terminal interface in a cellular radio system, to identify page requests received while the radio terminal interface is in an idle state, to respond to received page requests specifying the first MIN by composing sage responses specifying the first MIN, and to respond to received page requests specifying the second MIN by composing page responses specifying the second MIN, the controller being operable to respond to a dialling sequence received by the radio terminal interface to compose a service request, the service request specifying the first MIN when the dialling sequence does not contain a predetermined dialling sequence, and the service request specifying the second MIN when the dialling sequence does contain the predetermined dialling sequence.

4. A radio terminal transceiver as defined in claim 1, further comprising:

a Radio Frequency (RF) interface for coupling to an antenna system to receive radio signals from a base station transceiver of the cellular radio system and to transmit radio signals from the radio terminal transceiver to the base station transceiver; and an audio interface for coupling to telecommunications terminals to receive voice-band signals from the telecommunications terminals and to transmit voice-band signals from the radio terminal transceiver to the telecommunications terminals.

5. A radio terminal transceiver as defined in claim 4, wherein the signal processor is coupled between the RF interface and the audio interface.

6. A radio terminal transceiver as defined in claim 4, further comprising:

an RJ-11 interface connected to the audio interface for coupling the audio interface to telecommunications terminals.

7. A radio terminal transceiver as defined in claim 4, further comprising:

a cellular radio terminal handset connected to the audio interface.

8. A radio terminal transceiver as defined in claim 4, further comprising:

an antenna system coupled to the RF interface for receiving RF signals from and transmitting RF signals to the base station transceiver.

9. A radio terminal transceiver as defined in claim 8, wherein the antenna system comprises at least two antennas arranged to provide spatial diversity.

10. A method for operating a radio terminal transceiver comprising the steps of:

registering first and second Mobile Identification Numbers (MINs) assigned to the radio terminal transceiver in a cellular radio system;

receiving page requests at the radio terminal transceiver while the radio terminal transceiver is in an idle state;

responding to received page requests specifying the first MIN by transmitting from the radio terminal transceiver page responses specifying the first MIN where the first MIN instructs the cellular radio system to allocate one of an analog channel and a digital channel with a preference for the digital channel for the transmitting; and responding to received page requests specifying the second MIN by transmitting from the radio terminal transceiver page responses specifying the second MIN where the second MIN instructs the cellular radio system to always allocate an available analog channel for data transmissions between the cellular radio system and the radio terminal transceiver.

11. A method as defined in claim 10, wherein the step of registering first and second MINs is performed automatically when the radio terminal transceiver is turned on.

12. A method as defined in claim 11, wherein the step of registering first and second MINs comprises successively registering the first and second MINs according to standardized registration sequences.

13. A method as defined in claim 10, further comprising the step of:

receiving initial traffic channel designation messages at the radio terminal transceiver; and responding to received initial traffic channel designation messages by configuring a signal processor of the radio terminal transceiver in a first mode for conversion of Time Division Multiple Access (TDMA) signals to voice-band signals and for conversion of voice-band signals to TDMA signals.

14. A method as defined in claim 10, further comprising:

receiving initial voice channel designation messages at the radio terminal transceiver; and responding to received initial voice channel designation messages by configuring a signal processor of the radio terminal transceiver in a second mode for conversion of Advanced Mobile Phone Service (AMPS) signals to voice-band signals and for conversion of voice-band signals to AMPS signals.

15. A method for operating a radio terminal interface, comprising:

registering first and second Mobile Identification Numbers (MINs) assigned to the radio terminal interface in a cellular radio system;

receiving page requests at the radio terminal interface while the radio terminal interface is in an idle state;

responding to received page requests specifying the first MIN by transmitting from the interface page responses specifying the first MIN;

responding to received page requests specifying the second MIN by transmitting from the interface page responses specifying the second MIN; and responding to a dialling sequence received at the radio terminal interface by composing and transmitting from the radio terminal interface a service request, the service request specifying the first MIN when the dialling sequence does not contain a predetermined dialling sequence, and the service request specifying the second MIN when the dialling sequence does contain the predetermined dialling sequence.

16. A radio communications system, comprising:

at least one radio terminal transceiver operable in a digital mode to receive and transmit digital radio signals over a digital radio channel and operable in an analog mode to receive and transmit analog radio signals over an analog radio channel, the radio terminal transceiver being responsive to page requests specifying a first terminal identifier to transmit a page response specifying the first terminal identifier and being responsive to page requests specifying a second terminal identifier to transmit a page response specifying the second terminal identifier;

at least one base station transceiver operable in a digital mode to receive and transmit digital radio signals over a digital radio channel and operable in an analog mode to receive and transmit analog radio signals over an analog radio channel; and at least one base station controller operable to allocate one of an analog radio channel and preferably a digital radio channel for communication between the radio terminal transceiver and the base station transceiver upon receipt of a page response specifying the first terminal identifier and operable to always allocate an available analog radio channel for communication between the radio terminal transceiver and the base station transceiver upon receipt of a page response specifying the second terminal identifier.

17. A radio communications system as defined in claim 16, wherein the base station controller is operable to allocate preferentially a digital radio channel for communication between the radio terminal transceiver and the base station transceiver upon receipt of a page response specifying the first terminal identifier.

18. A radio communications system as defined in claim 16, wherein each digital radio channel is a Time Division Multiple Access (TDMA) radio channel, each analog radio channel is an Advanced Mobile Phone Service (AMPS) radio channel, and each terminal identifier is a Mobile Identification Number (MIN).

19. A radio communications system as defined in claim 16, wherein the base station controller is implemented in a Mobile Telephone Switching office (MTSO).

20. A method of operating a radio communications system comprising:

providing a radio communications system having, at least one radio terminal transceiver operable in a digital mode to receive and transmit digital radio signals over a digital radio channel and operable in an analog mode to receive and transmit analog radio signals over an analog radio channel, the radio terminal transceiver being responsive to page requests specifying a first terminal identifier to transmit a page response specifying the first terminal identifier and being responsive to page requests specifying a second terminal identifier to transmit a page response specifying the second terminal identifier, at least one base station transceiver operable in a digital mode to receive and transmit digital radio signals over a digital radio channel and operable in an analog mode to receive and transmit analog radio signals over an analog radio channel, and at least one base station controller;

operating the base station controller to allocate one of an analog radio channel and preferably a digital radio channel for communication between the radio terminal transceiver and the base station transceiver upon receipt of a page response specifying the first terminal identifier; and operating the base station controller to always allocate an available analog radio channel for communication between the radio terminal transceiver and the base station transceiver upon receipt of a page response specifying the second terminal identifier.

21. A method as defined in claim 20, wherein the step of operating the base station controller to allocate one of a digital radio channel and an analog radio channel comprises operating the base station controller to allocate preferentially a digital radio channel for communication between the radio terminal transceiver and the base station transceiver upon receipt of a page response specifying the first terminal identifier.

* * * * *